United States Patent [19]
Gregoire et al.

[11] Patent Number: 4,903,228
[45] Date of Patent: Feb. 20, 1990

[54] SINGLE CYCLE MERGE/LOGIC UNIT

[75] Inventors: Dennis G. Gregoire; Randall D. Groves; Martin S. Schmookler, all of Austin, Tex.

[73] Assignee: International Business Machines Corporation, Armonk, N.Y.

[21] Appl. No.: 269,202

[22] Filed: Nov. 9, 1988

[51] Int. Cl.⁴ .......................... G06F 7/00; G06F 7/52; G06F 9/32
[52] U.S. Cl. ..................................... 364/900; 364/947; 364/947.1; 364/947.3; 364/947.6; 364/947.7; 364/950; 364/950.2
[58] Field of Search ................................. 364/200, 900

[56] References Cited

U.S. PATENT DOCUMENTS

| | | | |
|---|---|---|---|
| 3,982,229 | 9/1976 | Rouse et al. | 364/200 |
| 4,012,722 | 3/1977 | Gajski et al. | 364/900 |
| 4,085,447 | 4/1978 | Pertl et al. | 364/900 |
| 4,139,899 | 9/1976 | Rouse et al. | 364/200 |
| 4,569,016 | 2/1986 | Hao et al. | 364/200 |

OTHER PUBLICATIONS

"Processor Unit Mask Generation Control", IBM Technical Disclosure Bulletin, vol. 27, No. 11, Apr. 1985, pp. 6419-6421.
"ALU Merge Operation", IBM Technical Disclosure Bulletin, vol. 27, No. 1B, Jun. 1984, pp. 747-750.

Primary Examiner—Archie E. Williams, Jr.
Assistant Examiner—Emily Y. Chan
Attorney, Agent, or Firm—Thomas E. Tyson

[57] ABSTRACT

A data processing circuit that performs either a merge or Boolean logic operation on data within a single clock cycle in response to an instruction. The circuit includes a control circuit for receiving an instruction during a clock cycle and providing a plurality of control signals in response to the instruction. Data selector circuitry is included for providing a plurality of data words in response to the control signals from the control circuit. Additionally, a rotator is connected to at least one data selector for rotating at least one of the data words in response to a control signal from the control circuit. Logic circuitry is provided for logically combining bits form the rotator and the data selector circuitry in response to control signals from the control circuit for providing data output within the single clock cycle.

8 Claims, 6 Drawing Sheets

FIG. 6

| | CONTROL SIGNALS | | | | | | | | | | |
|---|---|---|---|---|---|---|---|---|---|---|---|
| | DATA SELECTOR 12 | | | | DATA SELECTOR 14 | | | DATA SELECTOR 16 | LEFT ROTATE AMOUNT | | MERGE/LOGIC CONTROLS |
| OPERATION | -SELECT HARDWARE MASK | -SELECT B | SELECT B | -SELECT B | -SELECT S | -SELECT OS | SELECT D | -SELECT D | +ROTATE AMT (0) | +ROTATE AMT (1) / +CTL 1 | +CTL 2 |
| REFERENCE # | 22 | 24 | 26 | 28 | 30 | 32 | 34 | 36 | 38 | 40 | 42 |
| INSERT UNDER HW MASK | 0 | 1 | 1 | 0 | 1 | 0 | 1 | 1 | $r_1$ | a | 1 |
| INSERT UNDER SW MASK | 1 | 0 | 1 | 0 | 1 | 0 | 1 | 1 | $r_1$ | a | 1 |
| AND | 1 | 0 | 1 | x | 0 | 0 | 1 | 0 | 0 | x | x |
| NAND | 1 | 0 | 0 | 1 | 1 | 1 | 0 | 0 | 0 | x | 1 |
| OR | 1 | 1 | 1 | 1 | 1 | 0 | 1 | 0 | 0 | x | 1 |
| NOR | 1 | 0 | 0 | x | 0 | 1 | 0 | 0 | 0 | x | x |
| XOR | 1 | 0 | 1 | 1 | 1 | 1 | 0 | 0 | 0 | x | 0 |
| EQUIVALENCE (XNOR) | 1 | 0 | 1 | 1 | 1 | 0 | 1 | 0 | 0 | x | 0 |
| PASS INPUT R | 1 | 1 | 1 | x | x | $b_1$ | $b_2$ | $r_0$ | $r_1$ | x | x |
| PASS INPUT M | $c_1$ | $c_2$ | $c_3$ | x | 0 | 1 | 1 | x | x | x | 1 |
| PASS INPUT I | x | 0 | 0 | 0 | 1 | x | x | x | x | x | 1 |

SINGLE CYCLE MERGE/LOGIC UNIT

TECHNICAL FIELD

The present invention relates to a data processing system and more specifically the a data processing circuit for performing either merge or Boolean logic operations within a single clock cycle.

BACKGROUND ART

A recent direction for computer architecture is towards the simplification of instruction execution. An example of such an architecture is the Reduced Instruction Set Computer (RISC) architectures that have been designed to increase the speed of instruction execution. A goal of RISC architecture is to provide computer instructions that can be executed in a single clock cycle. Therefore, by executing more instructions per unit of time, the efficiency of the computer system is increased.

One subset of instructions that are executed by computers are mask instructions. A mask instruction is commonly performed by a logical AND operation between two data words. One data word, the mask word, includes 1's in bit positions where the bit values of the word to be operated on are to remain unchanged. The mask word contains 0's in those bit locations that are to be masked out of the word to be operated on. In some traditional systems, the mask operation will take several cycles.

Another operation related to the mask operation is merge operation. In the merge operation a portion of data in a first data word is inserted into bit locations in a second data word. The locations of the insertion are defined by a bit mask. The merge operation also takes several clock cycles since the initial asking operation and the insertion operation usually occur at different times.

A merge unit performs the mask and insert under mask operations previously described. Also, it is common for the merge unit to be used with a rotator to perform shift operations, i.e., where the bit values of a word are rotated relative to their initial bit locations and the bits which "wrap around" are suppressed. In a traditional central processing unit (CPU), an arithmetic logic (ALU) is provided in parallel with the merge unit. The ALU performs arithmetic operations on data words provided to it. These arithmetic operations include Boolean logic operations.

U.S. Pat. No. 4,569,016 entitled "Mechanism for Implementing One Machine Cycle Executable Mask and Rotate Instructions in a Primitive Instruction Set Computer System" discloses a mechanism for performing a single cycle mask and rotate instruction.

U.S. Pat. No. 3,982,229 entitled "Combinational Logic Arrangement" discloses a circuit for performing shift rotate and insert under mask operations.

U.S. Pat. No. 4,139,899 entitled "Shift Network Having a Mask Generator and a Rotator" discloses a circuit for performing rotation, shift and mask vector generation functions.

U.S. Pat. No. 4,085,447 entitled "Right Justified Mask Transfer Apparatus" discloses a circuit for performing a logical bit by bit ANDing of a multibit data word with a multibit mask such that only those bit positions of the data word for which the corresponding bits of the mask word are of a predetermined binary value are collected contiguously in a mask transfer . register and wherein all other bit positions are ignored.

U.S. Pat. No. 4,012,722 entitled "High Speed Modular Mask Generator" discloses a circuit for generating mask words.

*IBM Technical Disclosure Bulletin*, Vol. 27, No. 11, Apr., 1985, pages 6419-6421, entitled "Processor Unit Mask Generation Control" discloses an arithmetic logic unit containing a mask generator to build a 32 bit mask string. The masks provided are used to perform shift and rotate instructions. IBM Technical Disclosure Bulletin, Vol. 27, No. 1B, June 1984, pages 747-750, entitled "ALU Merge Operation" discloses a merge circuit within a arithmetic logic unit.

The above prior art addresses the merge, mask and Boolean logic operations. However, the prior art does not disclose the capability to perform both Boolean logic operations and merge or mask operations within the same circuit. It is an object of the present invention to provide a capability to perform either merge, mask or Boolean logic operations within a single circuit. It is also an object of the present invention to perform such operations within a single clock cycle.

DISCLOSURE OF THE INVENTION

In accordance with the present invention a data processor circuit is provided that performs either a merge or Boolean logic operation on data within a single clock cycle in response to an instruction. This circuit includes a clock that provides a series of clock cycle signals, a control circuit connected to the clock that receives the instruction and in response thereto provides a selection signal, a rotator signal and a control signal to specify either the merge or Boolean logic operation in response to the instruction. The selection signal is provided to a data selector circuit that provides a plurality of data words. The rotator signal is provided to a rotator circuit that provides for the rotation of bits within at least one of the data words in response to the rotator signal. A logic circuit is provided that is connected to the control circuit, the data selector circuit, and the rotator circuit. The logic circuit logically combines bits from the words supplied by the data selector circuit and rotator circuit. These bits are logically combined in response to the control circuit. The logic circuit provides an output within the same clock cycle.

In a preferred embodiment, the data processing circuit includes a clock, a control circuit that decodes instructions and provides control signals in response to the decoded instruction, and a data selector that includes a plurality of data word multiplexors. One of the data word multiplexors is connected to a rotator circuit that rotates the received data word in response to a rotator signal received from the control circuit. The other data selector circuits are also controlled by the control circuit. A logic circuit is provided for logically combining the bits of data words received from the data multiplexors or from the data rotator in response to control signals received from the control circuit. A logical combining of bits is accomplished within the same clock cycle in which the instruction is received and decoded by the control circuit. In the preferred embodiment, the logic circuit includes the capability to perform a mask operation within the clock cycle upon a first data word from a data multiplexor, using a mask word that is provided by a second data multiplexor. The logic circuit also includes a circuit for indicating when a predetermined value in the received data word has been masked out during the mask operation. Also, the logic circuit includes the means to perform an insert under mask operation. Furthermore, in this preferred embodiment, the data selector circuit further includes the capability to provide a negated value of a data word or a data word having a predefined value.

BRIEF DESCRIPTION OF THE DRAWING

The novel features believed characteristic of the invention are set forth in the appended claims. The invention itself, however, as well as other features and advantages thereof, will be best understood by reference to the following Description of the Best Mode for Carrying Out the Invention, when read in conjunction with the accompanying figures, wherein:

FIG. 6 is a diagram listing and defining the control signals relative to instructions that are decoded by the control circuitry 10 of FIG. 1.

BEST MODE FOR CARRYING OUT THE INVENTION

Figure 1:
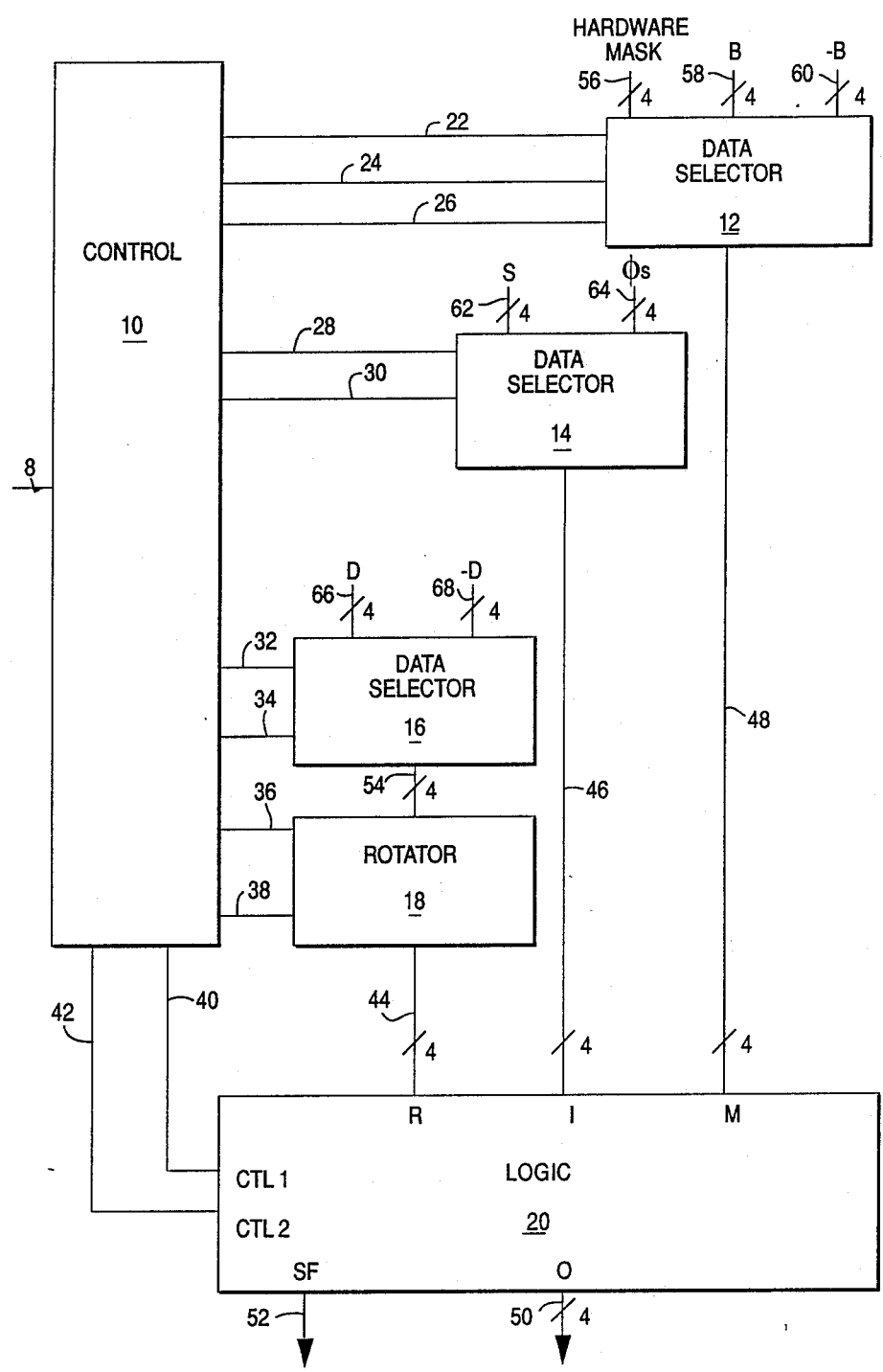
FIG. 1 is a block diagram of the merge/logic circuit.

This invention performs either merge or Boolean logic operations on data within a single clock cycle. FIG. 1 illustrates a block diagram of the present invention. In FIG. 1 a four bit merge/logic unit is disclosed. It should be obvious to those skilled in the art that merge/logic units of varying sizes would be possible using the teachings of this specification.

In FIG. 1, a control circuit 10 receives an instruction on line 8 from an instruction register. The control circuit 10 decodes the instruction from line 8 and provides several control signals in response to the instruction. The actual control signals are listed in FIG. 6 for each of the instruction decoded by control unit 10.

Three data selectors 12, 14 and 16 are provided. Data selector 12 includes three input lines 56, 58 and 60 and provides a single 4 bit output on line 48. The selection of one of the three input lines 56, 58 or 60 is controlled by the three control lines 22, 24 and 26 from control circuit 10. Input line 56 in the preferred embodiment is connected to a mask generation circuit that provides the hardware mask word. Input line 58 is connected to a register that provides operand B. Input line 60 provides a negated value of operand B. Output line 48 is connected to logic circuit 20.

The second data selector 14 includes two input lines 62 and 64. Input line 62 is connected to a register that provides operand S. Line 64 is connected to constant binary values of input (0's) into data selector 14. The selection of lines 62 or 64 are determine by the state of control lines 28 and 30 from control circuitry 10. The output of data selector 14 is provided on line 46 to the logic circuit 20.

The third data selector 16 includes two input lines 66 and 68 which are selected by the two control lines 32 and 34 connected to the control circuitry 10. Line 66 is connected to a register that provides operand D. The negated value of operand D is provided on line 68. The output of data selector 16, provided on line 54, is input to the rotator circuit 18. The rotator circuit 18 rotates the bits of the data word received from the data selector 16 in accordance with the control lines 36 and 38 from the control circuitry 10. The output of the rotator is provided on line 44 to the logic circuit 20.

The logic circuit 20 along with receiving lines 44, 46 and 48 from data selectors 16, 14 and 12, respectively, further receives control signals on lines 40 and 42 from the control circuitry 10. Logic circuitry 20 provides an output on the line 50. Additionally, logic circuit 20 provides a "spill flag" indication on line 52.

In operation, logic circuitry 20 logically combines the data words provided by the data selectors 16, 14, and 12 in accordance with the control signals on lines 40 and 42 received from control circuit 10. This is accomplished within a single clock cycle.

Figure 2:
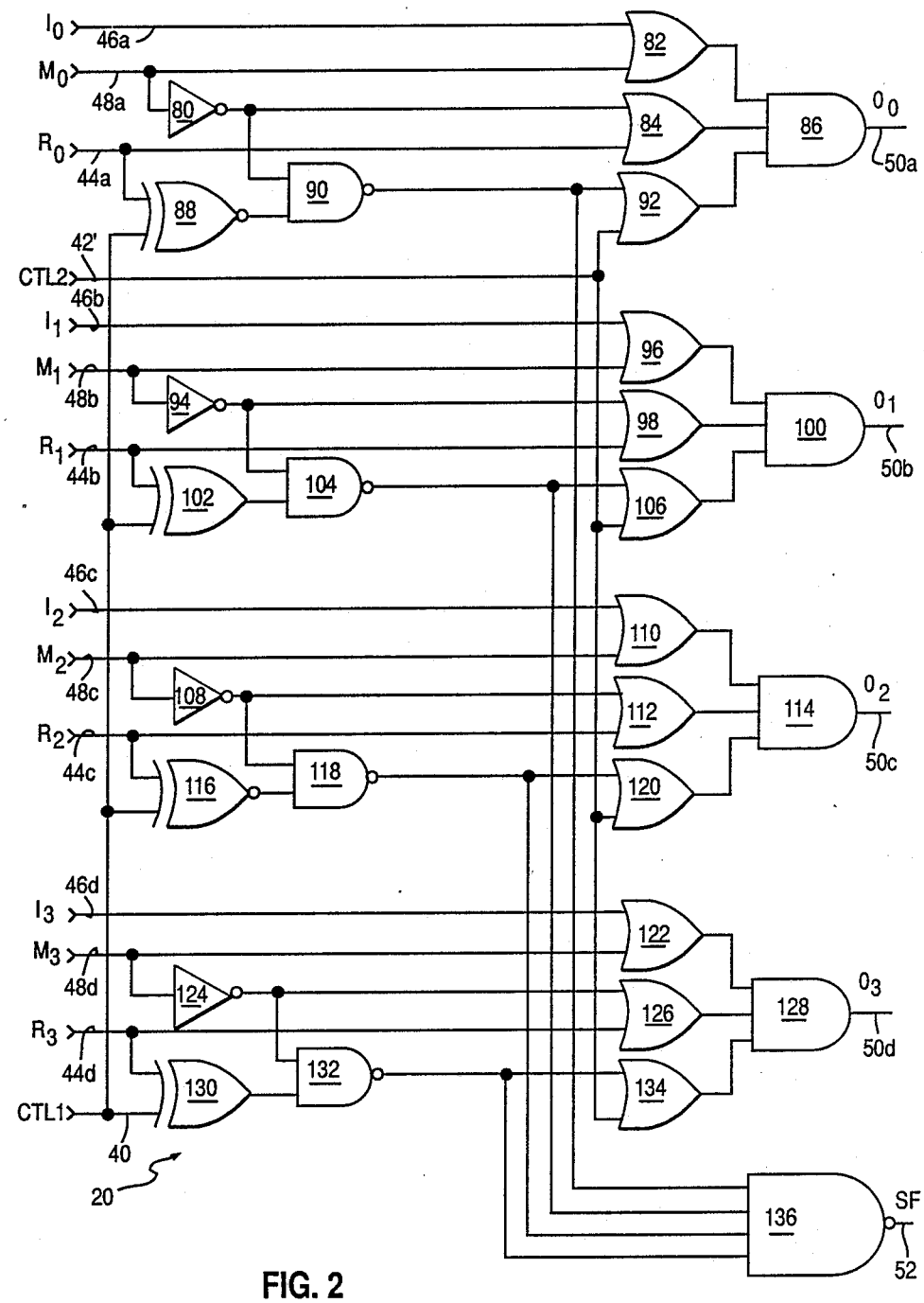
FIG. 2 is a schematic diagram of the logic circuit 20 of FIG. 1.

FIG. 2 is a logic diagram of logic circuit 20. The logic circuit 20 receives three four bit inputs from lines 46, 48 and 44 and provides a four bit output on lines 50a through 50d and the spill flag indication on line 52. The inputs on lines 46, 48 and 44 come from the data selectors which have been selected in accordance with the control signals from control circuitry 10 as previously discussed. Additionally, control lines 42 and 40 are provided as shown. The logic illustrated in FIG. 2 includes a similar network of gates for each bit of the four bit output word. For example, lines 46a, 48a and 44a are logically combined through inverter 80, exclusive OR gate 88, NAND gate 90, OR gates 82, 84, and 92 and AND gate 86 to provide the output on line 50a. The control signal on line 42 is provided to the OR gate 92 and the control signal on line 40 is provided to the exclusive OR gate 88. The operation of the logic will be discussed with an example to be presented later. Therefore the logic for each bit position of the outputs on lines 50a, 50b, 50c, and 50d are similar. Additionally, the spill flag output on line 52 is output from a NAND gate 136 which receives outputs from NAND gates 90, 104, 108 and 132, respectively, for the four bit positions of the logic circuit 20.

The merge/logic circuitry provides the spill flag which is a NAND of the lines shown. The rotate and merge under mask operations are used to merge data from a register and from an adder to form the low order bits of a product in a multiply operation. In this context the spilling of bits which differ from the product sign indicate an overflow. Thus it is necessary to detect either "spilled 1's" or "spilled 0's" depending on the value of the sign bit. Exclusive OR gates 88, 102, 116, and 130 are provided to conditionally invert the values on lines 44a through 44d respectively to determine when spilled 1's or spilled 0's are to be detected.

Figure 3:
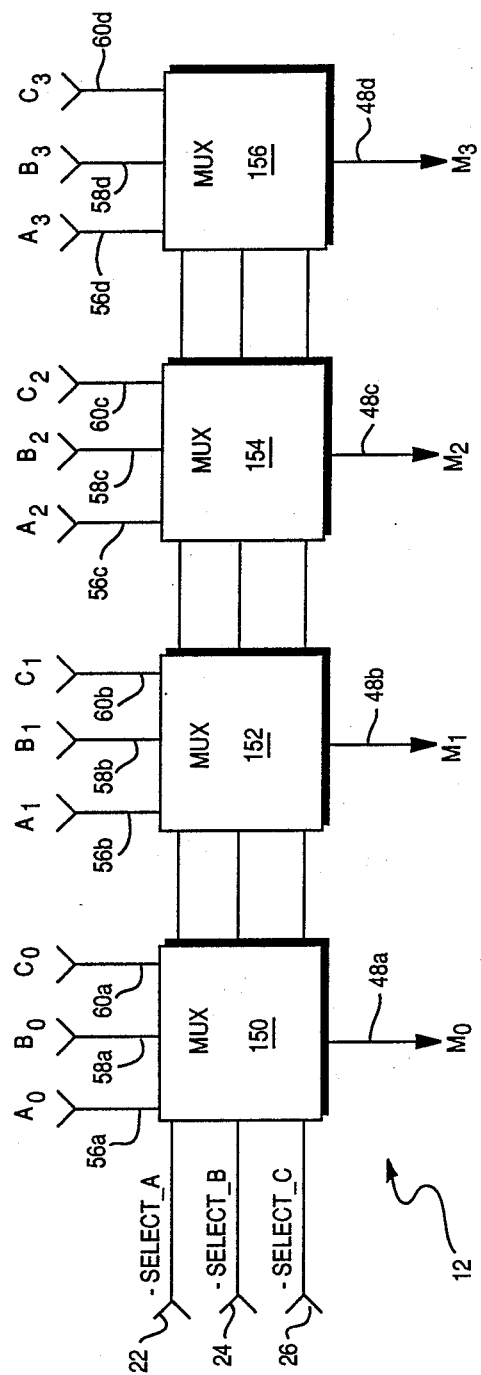
FIG. 3 is a schematic diagram of the data selector 12 of FIG. 1.
Figure 4:
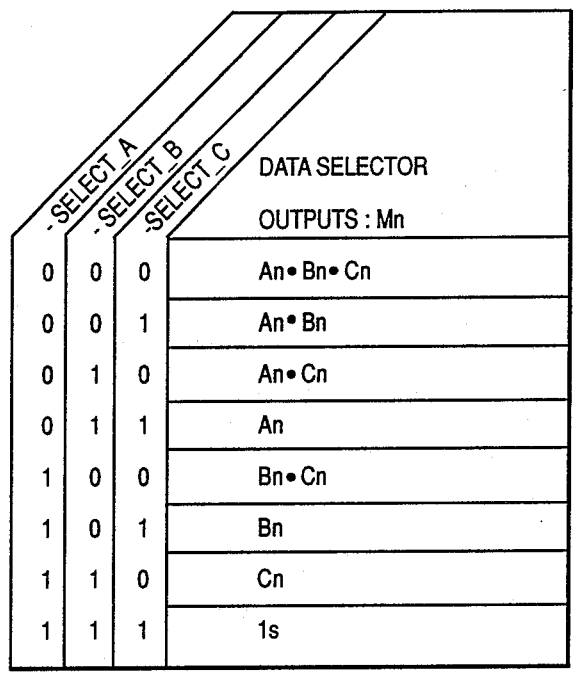
FIG. 4 is a truth table for data selector 12.

FIG. 3 is a schematic diagram of the data selector 12. FIG. 3 consists of four multiplexors 150, 152, 154, 156 that each have three inputs, such as in multiplexor 150, input lines 56a, 58a, and 60a. Each of the multiplexors 150, 152, 154 and 156 are connected to control lines 22, 24 and 26. Control lines 22, 24 and 26 select one of the three input lines for each of the multiplexors 150, 152, 154 and 156. This input line is then provided on output lines 48a through 48d. FIG. 4 is a truth table illustrating the effect of control lines 22, 24 and 26 on the operation of data selector 12.

Data selectors 14 and 16 are two input versions of the circuitry illustrated in FIGS. 3 and 4. In other words, the multiplexors for data selectors 1 and 16 are two input line multiplexors where the input lines are selected by the two control signals from the control circuitry 10.

Figure 5:
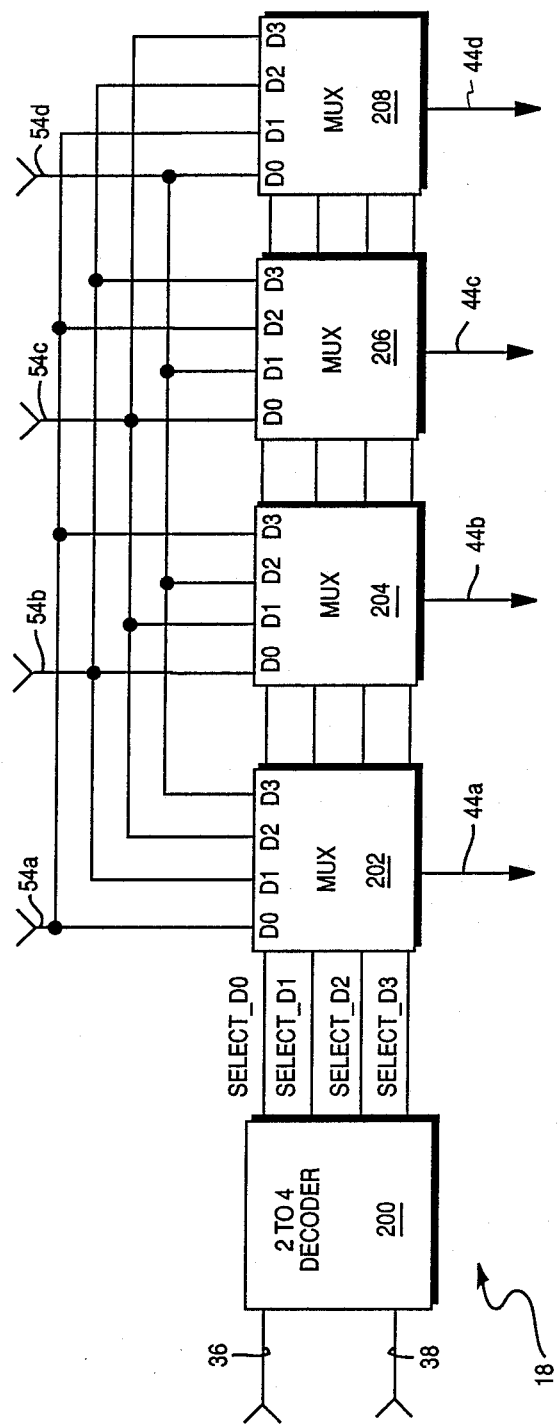
FIG. 5 is a schematic diagram of the rotator 18 of FIG. 1.

FIG. 5 is a schematic diagram of the rotator circuit 18. A two to four decoder circuit 200 is connected to control lines 36 and 38 to decode the data on these two lines to provide the four internal signals SELECT-D0, SELECT-D1, SELECT-D2, and SELECT-D3 as shown. All four of these lines, SELECT-D0 through SELECT-D3 are provided to four multiplexors 202, 204, 206 and 208. All four multiplexors 202, 204, 206 and 208 are connected to the inputs lines 54a, 54b, 54c and 54d. Therefore the data on control lines 36 and 38 specify which input line 54a through 54d is input to which multiplexor 202, 204, 206 or 208. The multiplexors 202, 204, 206 and 208 provide outputs on lines 44a, 44b, 44c, and 44d, respectively.

FIG. 6 is a table diagram illustrating how the instructions received on line 8 by the control circuitry 10 are decoded into the control signals 22, 24, 26, 28, 30, 32, 34, 36, 38, 40 and 42, respectively.

Where the notation, X, appears in FIG. 6 this indicates that either a 1 or a 0 value may be used. Other special notations which are used in FIG. 6 are explained below.

When the instruction to be executed is Insert Under Mask or Pass Input R, control signals 36 and 38 may have any value which represents the required rotation amount for the operand D. This is indicated in FIG. 6 by the notation R0, R1 in columns representing signals 36 and 38, respectively. The value of control signal 40 for Insert Under Mask instructions is represented in FIG. 6 as the variable A. When A=0 logic circuit. 20 is thereby conditioned to detect spilled 1's. When A=1 spilled 0's are detected.

When executing Pass Input R, the positive form of operand D will be passed to logic circuit 20 by data selector 16 if the values B1, B2 in FIG. 6 are set to 1, 0 respectively. If B1, B2 are set to 0, 1 respectively then the inverted form of the operand D will be used. In a similar manner the values C1, C2, C3 are set to select the desired word when executing Pass Input M.

It should be noted that the outputs of a data selector circuit are all 1's when none of select signals are active (0). This feature is used to obtain a word of 1's from data selector 14 in the execution of NAND, OR, XOR and Equivalence, and similarly to obtain a word of 1's from data selector 16 when executing Pass Input M.

Another feature of the data selector circuits is the Boolean ANDing of all selected inputs. This feature is used to obtain a word of 0's at the output of data selector 12 by selecting both operand B and its negated form when executing Pass Input I.

To more easily understand the operation of this invention, two examples will be discussed. In the first example an insert under mask operation will be performed. This instruction is received on line 8 by the control circuitry 10 and is decoded to provide the control signals as shown in FIG. 6. In this example the input on line 56 is 1100. This value will then appear upon the output line 48 of the selector 12. Operand S on input line 62 will have a value of '0101' and operand D on line 66 will have the value of '0001'. These values will appear on the output lines 46 and 54 of the selectors 14 and 16 respectively. In this example control lines 36 and 38 will have a value of 11. This will result in the internal rotator decoder circuit 200 (FIG. 5) in providing a SELECT-D3 signal whereby the value of '1000' will appear on the output line 44. Control line 40 will have a value of 0 thereby conditioning the logic means to detect spilled 1's. The value of the control signal on line 42 is a 1. Referring to FIG. 2, it will be seen that the output on lines 50a through 50d will be '1001'. The output on lines 50a through 50d are duplicates of the inputs on line 46 where the corresponding mask word inputs were 0. Where the mask bits are 1, the output correspond to the inputs from the rotator on line 44. The spill flag output on line 52 is 0 because no rotator bits which had a value of 1 were suppressed by the merge operation.

In the second example a Boolean OR operation is to be performed. For the OR operation, the control circuit 10 will set the control signals as indicated in the row labeled OR in FIG. 6. This will condition the data paths and logic circuitry 20 to form the Boolean OR of operand B on line 58 to the data selector 12 and operand D on line 66 to data selector 16. In this example, operand B will have the value of '1010'. The inverse of operand B or -B on line 60 will be selected by data selector 12 resulting in the value of '0101' appearing on the output line 48. Both control lines 28 and 30 in data selector 14 are inactive thus causing a value of '1111' to appear on the output line 46. In this example operand D on line 66 will have a value of '0011'. This value will appear on the output line 54 of data selector 16. The same value will appear on the output 44 of the rotator 18 since no rotation is accomplished in this example. When these values are presented to the logic circuit 20, the output on lines 50a through 50d are the value '1011' which is the Boolean OR of the two input words '1010' and '0011'.

Although the invention has been described with reference to the specific embodiment illustrated, this invention is not meant to be construed in a limiting sense. Various modifications of the disclosed embodiment, as well as other embodiments of the invention, will become apparent to those persons skilled in the art upon reference to this Best Mode for Carrying out the Invention. It is, therefore, contemplated that the appended claims will cover any such modifications or embodiments as may fall within the true scope of the invention.

We claim:

1. A data processing circuit for performing either a merge or Boolean logic operation on data within a single clock cycle in response to an instruction, said circuit comprising:
   control means for receiving an instruction during a clock cycle and providing a selection signal, a rotator signal and a control signal to specify either a merge or a Boolean logic operation in response to said instruction;
   data selector means for providing a plurality of data words, each containing a plurality of bits, in response to the selection signal;
   rotator means connected to said data selector means for rotating the bits of at least one of said provided data words in response to the rotator signal; and
   logic means for logically combining the bits from said data words from said data selector means and said rotator means in response to the control signal and including means for performing a mask operation within said clock cycle upon a first word from said data selector means with a mask word provided by said data selector means 2. A data processing circuit according to claim 1 wherein said logic means includes means for indicating when a predefined bit value is masked during a mask operation.

3. A data processing circuit according to claim 1 wherein said logic means includes means to perform an insert under mask operation within said clock cycle upon said first data word by inserting a portion of a second data word into said first data word in bit locations defined by said mask word.

4. A data processing circuit according to claim 3 wherein said logic means includes means for providing a signal output when a predefined bit value is masked during an insert under mask operation.

5. A data processing circuit according to claim 1 wherein said data selector means includes means for providing a negated value f a data word.

6. A data processing circuit according to claim 1 wherein said data selector means includes means for providing a data word having a predetermined value.

7. A data processing circuit according to claim 1 wherein said logic means includes means for performing a Boolean logic operation within the clock cycle on the data word bits from the rotator means and the data selector means.

8. A data processing circuit according to claim 7 wherein said Boolean logic means includes means for performing the Boolean operation on each bit location of said data output from the corresponding bit location in the data word from the rotator means and the corresponding bit location in the data word from the data selector means.

* * * * *

UNITED STATES PATENT AND TRADEMARK OFFICE
CERTIFICATE OF CORRECTION

PATENT NO. : 4,903,228
DATED : February 20, 1990
INVENTOR(S) : D. G. Gregoire et al It is certified that error appears in the above-identified patent and that said Letters Patent is hereby corrected as shown below:

Col. 7, line 10, delete "f" and insert --of--.

Signed and Sealed this

Tenth Day of December, 1991

Attest:

HARRY F. MANBECK, JR.

*Attesting Officer*  *Commissioner of Patents and Trademarks*